United States Patent
Chang et al.

(10) Patent No.: US 6,690,545 B1
(45) Date of Patent: Feb. 10, 2004

(54) AIR BEARING SLIDER INCLUDING A DEPRESSED REGION EXTENDING FROM A MAIN SUPPORT STRUCTURE BETWEEN A PRESSURIZED PAD SUPPORT BASE AND A CONTACT PAD SUPPORT BASE

(75) Inventors: Ciuter Chang, Fremont, CA (US); Ming-Ching Tang, Saratoga, CA (US); Martin J. Smallen, Cupertino, CA (US); Jih-Ping Peng, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 252 days.

(21) Appl. No.: 09/967,816

(22) Filed: Sep. 28, 2001

(51) Int. Cl.$^7$ ................................................. G11B 5/60
(52) U.S. Cl. .................. 360/237; 360/237.1; 360/246.2
(58) Field of Search ........................... 360/237.1, 237, 360/246.2, 235.7, 236.5

(56) References Cited

U.S. PATENT DOCUMENTS

| | | |
|---|---|---|
| 5,473,485 A | 12/1995 | Leung et al. |
| 6,445,543 B1 * | 9/2002 | Gui et al. ............... 360/236.6 |
| 6,445,544 B2 * | 9/2002 | Kohira et al. ............... 360/245 |

* cited by examiner

*Primary Examiner*—A. J. Heinz
(74) *Attorney, Agent, or Firm*—Won Tae C. Kim, Esq.; Milad G. Shara, Esq.; Stetina Brunda Garred & Brucker

(57) ABSTRACT

An air bearing slider for use in a disk drive that includes a rotatable magnetic disk. The slider includes a leading side and a trailing side. The slider further includes a pressurized pad including a pressurized pad air bearing surface. The pressurized pad is disposed between the leading and trailing sides. The slider further includes a contact pad disposed adjacent the trailing side and including a contact surface for sliding contact with the magnetic disk during operation of the disk drive. The contact pad includes a transducer disposed within the contact pad for reading and writing data from and to the magnetic disk. The slider further includes a depressed region disposed between the pressurized pad and the contact pad for mitigating air pressure adjacent the contact surface relative to air pressure adjacent the pressurized pad air bearing surface during operation of the disk drive.

14 Claims, 5 Drawing Sheets

AIR BEARING SLIDER INCLUDING A DEPRESSED REGION EXTENDING FROM A MAIN SUPPORT STRUCTURE BETWEEN A PRESSURIZED PAD SUPPORT BASE AND A CONTACT PAD SUPPORT BASE

BACKGROUND OF THE INVENTION

CROSS-REFERENCE TO RELATED APPLICATIONS

Not applicable.

1. Field of the Invention

The present invention relates generally to a disk drive including an air bearing slider including a pressurized pad separated from a contact pad that is in sliding contact with a magnetic disk.

2. Description of the Prior Art

The typical hard disk drive includes a head disk assembly (HDA) and a printed circuit board assembly (PCBA) attached to a disk drive base of the, HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost disk. Additional disks may be stacked and separated with annular disk spacers that are disposed about the hub. The head stack assembly has an actuator assembly including at least one air bearing slider or head, typically several, for reading and writing data to and from the disk. Each air bearing slider includes a magnetic transducer. An example of a slider is disclosed in U.S. Pat. No. 5,473,485 (incorporated herein by reference) that describes a tri-pad slider where a center pad contains a transducer. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator body that has a bore and a pivot bearing cartridge engaged within the bore for facilitating the actuator body to rotate between limited positions. The actuator assembly further includes a coil portion that extends from one side of the actuator body to interact with one or more permanent magnets to form a voice coil motor. One or more actuator arms extend from an opposite side of the actuator body. A head gimbal assembly includes an air bearing slider that is attached to a suspension with a gimbal. Head gimbal assemblies are distally attached to each of the actuator arms. The head gimbal assemblies and the flex circuit cable assembly are attached to the actuator assembly.

In order to increase the amount of data that may be stored upon a given disk, the recording density of the tracks of the magnetic disks has increased steadily. As such, it has become necessary within the field of hard disk drives to "fly" the magnetic transducer closer to the magnetic disk. By way of illustration, referring now to FIG. 1, there is depicted a prior art air bearing slider 1. The prior art air bearing slider 1 includes leading and trailing sides 2, 3. A center pad 4 extends from a main support structure 5. The center pad 4 includes an air bearing surface 6. A transducer 7 is disposed within the center pad 4 adjacent the trailing side 3. The prior art air bearing slider 1 further has a pair of main rails 8, each having an air bearing surface 9. Typically, the slider 1 is configured to fly with the trailing side 3 (and therefore the transducer 7) close to the disk surface without contacting the disk surface.

While the air bearing slider 1 may be configured such that the trailing side 3 is in contact with the disk surface for minimizing the distance between the transducer 7 and the disk surface, significant wear problems associated with the slider 1 and the disk surface are introduced. Operated in this manner, air pressure along the slider 1 progressively increases towards the trailing side 3. Thus a large amount of air pressure is built up against the center pad 4. To maintain the contact of center pad 4 at trailing side 3 with the disk, a "contact force" is introduced within the contact area. The amount of this contact force equals to the difference between preload of the suspension and the force generated by the air pressure outside the contact area. Using a highly pressurized area as the contact area results in a relatively higher contact force. Such a relatively higher contact force results in excessive wear of the center pad 4 and the disk that eventually results in damage to the same. Accordingly, there is a need in the art for an improved air bearing slider arrangement in comparison to the prior art.

SUMMARY OF THE INVENTION

An aspect of the invention can be regarded an air bearing slider for use in disk drive that includes a rotatable magnetic disk. The slider includes a leading side and a trailing side. The slider further includes a pressurized pad including a pressurized pad air bearing surface. The pressurized pad is disposed between the leading and trailing sides. The slider further includes a contact pad disposed adjacent the trailing side and including a contact surface for sliding contact with the magnetic disk during operation of the disk drive. The contact pad includes a transducer disposed within the contact pad for reading and writing data from and to the magnetic disk. The slider further includes a depressed region disposed between the pressurized pad and the contact pad for mitigating air pressure adjacent the contact surface relative to air pressure adjacent the pressurized pad air bearing surface during operation of the disk drive.

According to an embodiment of an aspect of the present invention, the contact surface is preferably sized smaller than the pressurized pad air bearing surface. The air bearing slider may further include first and second main rails disposed between the leading and trailing sides. The first main rail has a first main rail air bearing surface, and the second main rail has a second main rail air bearing surface. The pressurized pad is disposed between the first and second main rails. The pressurized pad and the contact pad may be centered with respect to the first and second main rails. Alternatively, the pressurized pad and the contact pad may be biased towards a respective one of the first and second main rails. The pressurized pad may additionally be integrally formed with the respective one of the first and second main rails.

In another embodiment, the air bearing slider may further include a pressurized pad support base and the pressurized pad may extend from the pressurized pad support base. The contact pad may also extend from the contact pad support base. The contact pad may extend from the contact pad support base by about 0.1 to 0.3 microns. The pressurized pad support base and the contact pad support base may be integrally formed, with the depressed region extending from the pressurized pad support base and the contact pad support base.

In another embodiment, the air bearing slider may further include a main support structure. The pressurized pad support base and the contact pad support base may extend from the main support structure, and the depressed region may extend from the main support structure between the pressurized pad support base and the contact pad support base. The pressurized pad support base and the contact pad support base may extend from the main support structure by about 1 to 3 microns.

In yet another embodiment, the air bearing slider may further include a pressurized pad support base and a main support structure. The pressurized pad may extend from the pressurized pad support base, and the pressurized pad support base and the contact pad may extend from the main support structure.

The depressed region may extend from about 50 to about 300 microns between the pressurized pad and the contact pad.

According to additional aspects of the present invention, the above-described air bearing slider may be incorporated into a disk drive.

DESCRIPTION OF THE PREFERRED EMBODIMENTS

Figure 1:
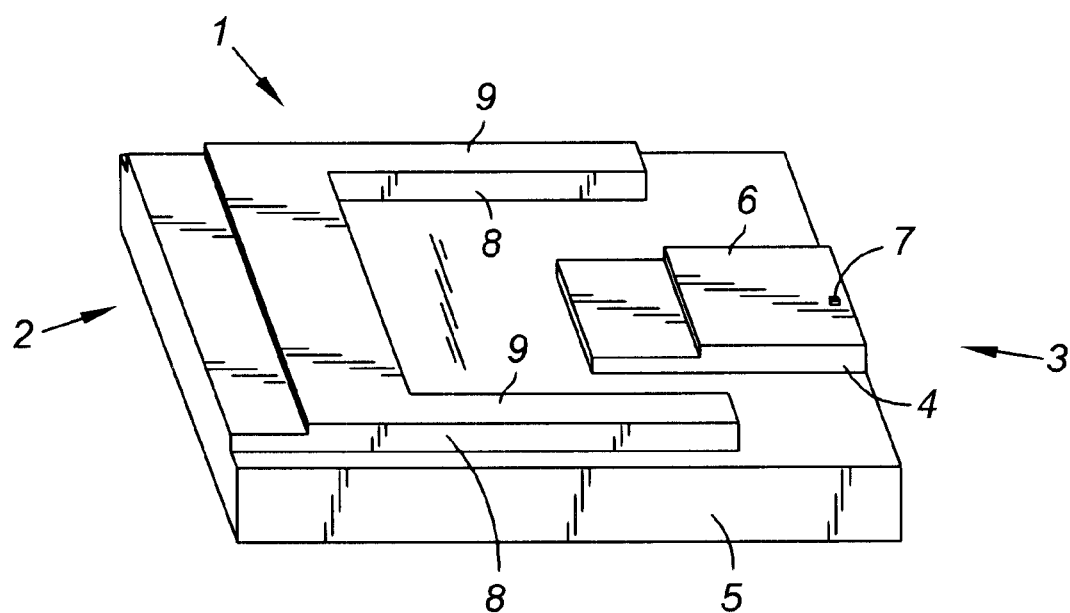
FIG. 1 is a perspective view of a prior art air bearing slider.

Referring now to the drawings wherein the showings are for purposes of illustrating preferred embodiments of the present invention only, and not for purposes of limiting the same, FIGS. 2–9 illustrate a disk drive 10 and various air bearing slider embodiments in accordance with the aspects of the present invention.

Figure 2:
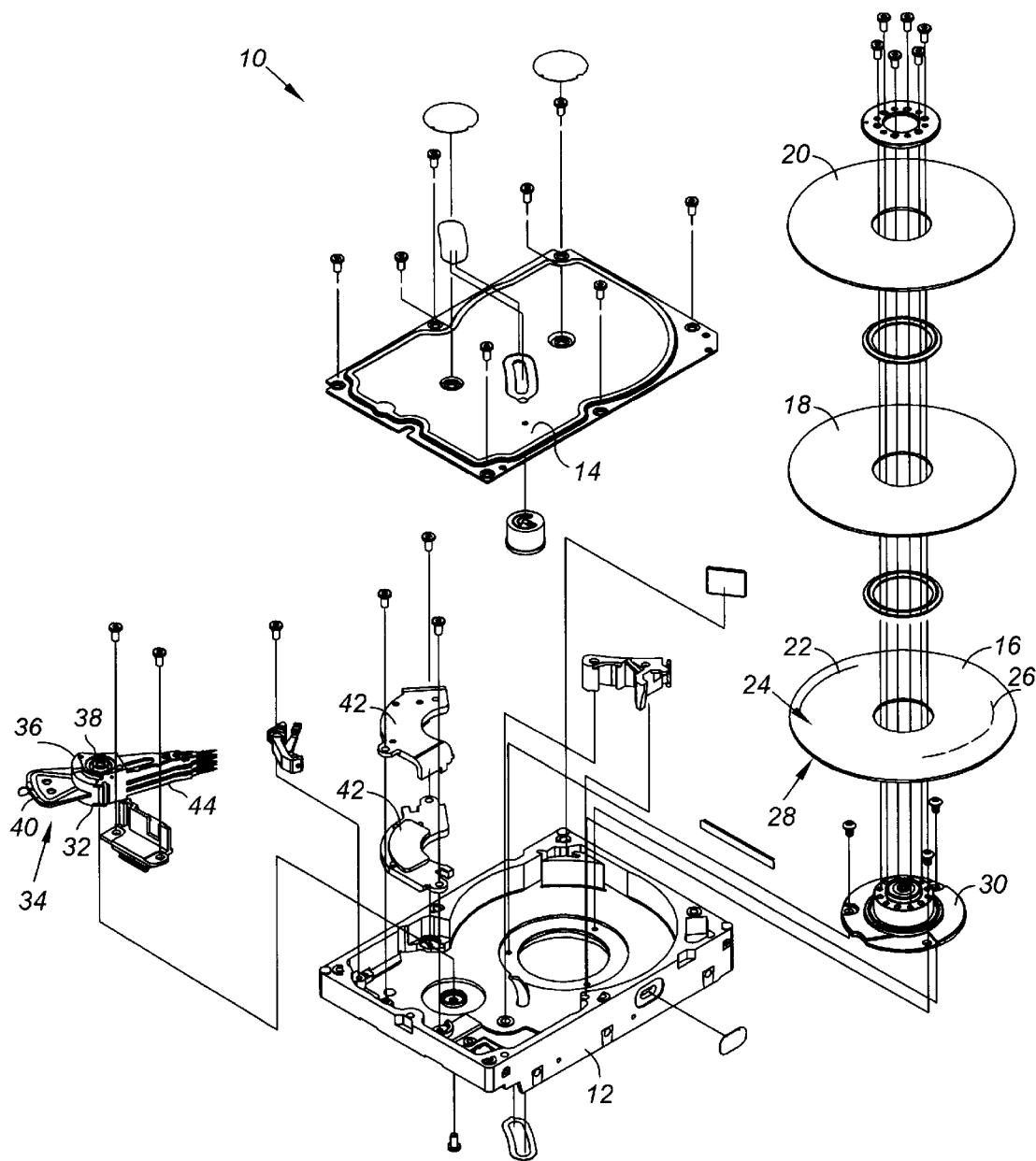
FIG. 2 is an exploded perspective view of a disk drive including air bearing sliders as constructed in accordance with aspects of the present invention.

Referring now to FIG. 2 there is depicted an exploded perspective view a disk drive 10 constructed in accordance with an aspect of the present invention. The disk drive 10 includes a head disk assembly (HDA) and a printed circuit board assembly (PCBA). The head disk assembly includes a disk drive base 12 and a cover 14 that collectively house magnetic disks 16, 18, 20. The disks 16, 18, 20 each contain a plurality of tracks 22 for storing data. The disks 16, 18, 20 may be two-sided, and thus for example, the disk 16 is shown having a track 22 on an upper facing side 24 and a track 26 (shown in phantom) on a lower facing side 28 (as additionally depicted in FIGS. 2 and 3). The head disk assembly further includes a spindle motor 30 for rotating the disks 16, 18, 20. The head disk assembly further includes a head stack assembly 32 and a pivot bearing cartridge 38.

The head stack assembly 32 includes a rotatable actuator 34 and a plurality of attached head gimbal assemblies. The actuator 34 includes an actuator body 36 that has a bore and the pivot bearing cartridge 38 engaged within the bore for facilitating the actuator body 36 to rotate between limited positions. The actuator 34 further includes a coil portion 40 that extends from one side of the actuator body 36 to interact with a pair of permanent magnets. 42 to form a voice coil motor. A plurality of actuator arms, the lowermost one of which being denoted 44, extend from an opposite side of the actuator body 36. As the disks 16, 18, 20 are two sided, each of the actuator arms include either one or two head gimbal assemblies associated with the adjacent sides of the disks 16, 18, 20.

Figure 3:
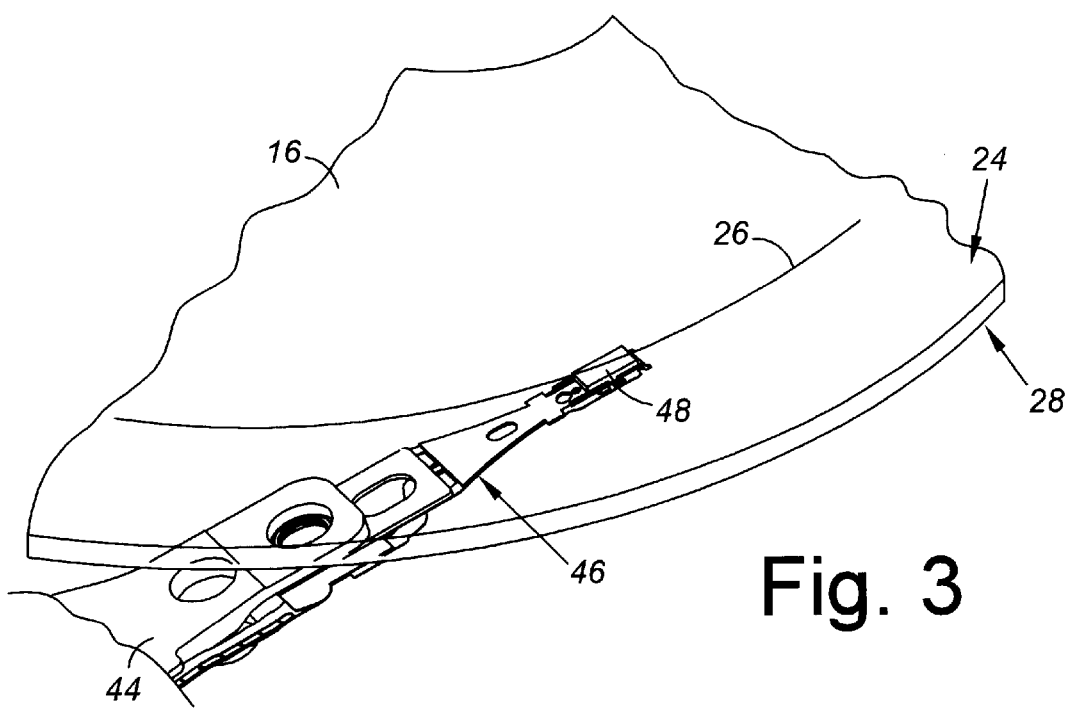
FIG. 3 is an enlarged view of a portion of a magnetic disk shown with a portion of a head gimbal assembly including an air bearing slider as constructed in accordance with aspects of the present invention.
Figure 4:
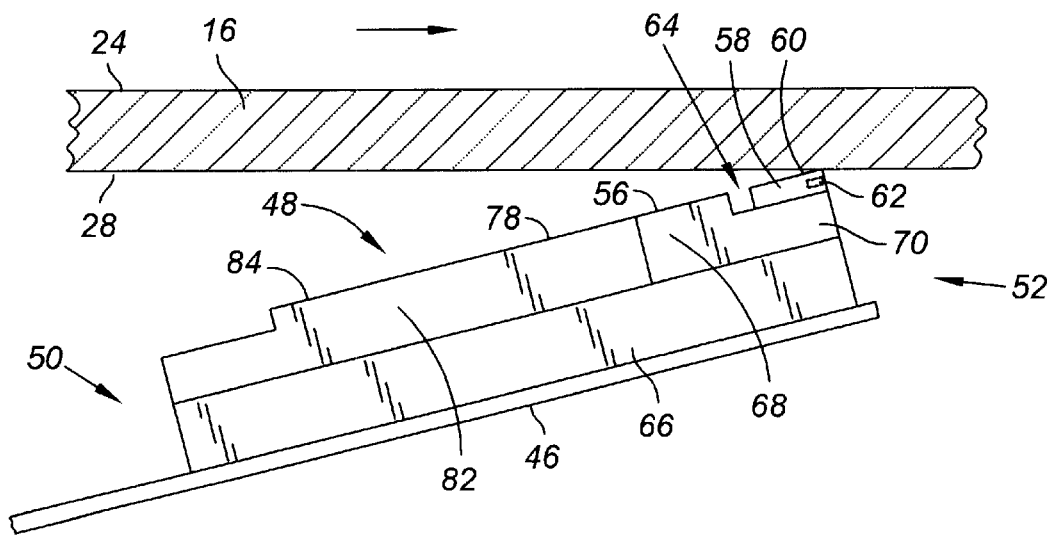
FIG. 4 is a side view of an embodiment of an air bearing slider as constructed in accordance with aspects of the present invention as shown in sliding contact with a magnetic disk.

Referring now to FIG. 3, there is depicted the distal end of the actuator arm 44 shown with a portion of the disk 16. Each of the head gimbal assemblies includes a suspension 46. An air bearing slider 48 of an embodiment of the present invention is attached to the suspension 46 via a gimbal (not shown). FIG. 4 is an enlarged side view of the air bearing slider 48 of FIG. 3. As discussed below, the air bearing slider 48 is configured to make sliding contact with the lower facing side 28 of the disk 16 for reading and/or writing data from and to the track 24 of the disk 16.

Figure 5:
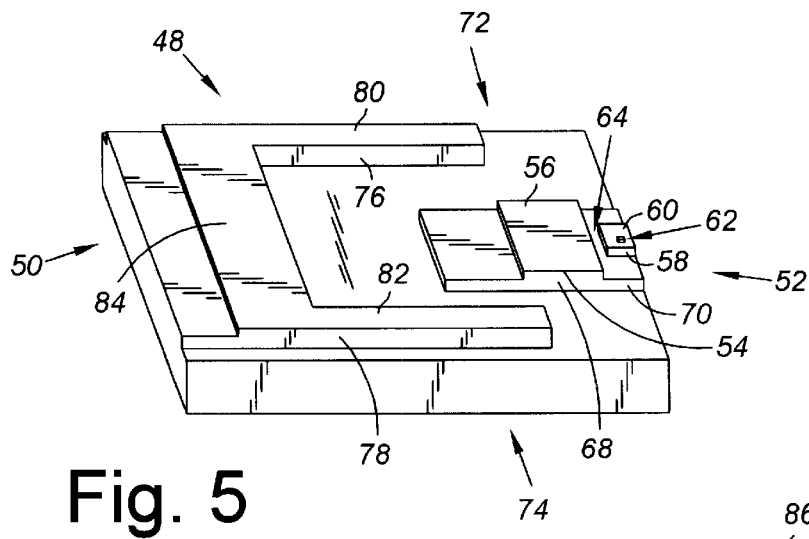
FIG. 5 is a perspective view of the air bearing slider of FIG. 4.

Referring additionally to FIG. 5, an aspect of the invention can be regarded as the air bearing slider 48 for use in the disk drive 10, which includes the rotatable magnetic disk 16. The slider 48 includes a leading side 50 and a trailing side 52. The slider 48 further includes a pressurized pad 54 including a pressurized pad air bearing surface 56. The pressurized pad 54 is disposed between the leading and trailing sides 50, 52. The slider 48 further includes a contact pad 58 disposed adjacent the trailing side 52. The contact pad 58 includes a contact surface 60 for sliding contact with the magnetic disk 16 during operation of the disk drive 10. The contact pad 58 includes a transducer 62 (shown in phantom) disposed within the contact pad 58 for reading and writing data from and to the magnetic disk 16. The transducer 62 may include an MR element, such as a GMR element, and an inductive write element. Advantageously, as the slider 48 is disposed in contact with the disk 16, the distance between the transducer 62 and the track 26 is minimized. The slider 48 further includes a depressed region 64 disposed between the pressurized pad 54 and the contact pad 58 for mitigating air pressure adjacent the contact surface 60 relative to air pressure adjacent the pressurized pad air bearing surface 56 during operation of the disk drive 10.

The suspension 46 is configured to maintain the air bearing slider 48, and in particular the contact surface 60, in sliding contact with the disk 16. In practice, the pitch angle of the slider 48 with respect to the disk 16 is on the order of 50 to 400 micro-radians. As such, it is understood that the angulation of the slider 48 as shown in FIG. 4 is exaggerated for ease of discussion and depiction.

In order to maintain the position of the slider 48 adjacent the disk 16, the suspension 46 is configured to exert a force against the attached slider 48 towards the disk 16. As the contact pad 58 is in contact with the disk 16, it is understood that the net amount of force of the slider 48 against the disk 16 is proportional with the amount of wear of the contact surface 58. However, counteracting the force applied to the slider 48 by the suspension 46 are forces which are aerodynamic in nature associated with air pressure adjacent the pressurized pad air bearing surface 56 and other air bearing surfaces of the slider 48.

The pitch angle of the air bearing slider 48 is such that the air pressure increases along the slider 48 from the leading side 50 to the trailing side 52. This is because the relative distance or air gap between the slider 48 and the disk 16 is generally reduced. Importantly, however, the depressed region 64 results in a geometry of the slider 48 that specifically expands the air gap with the disk 16 immediately downstream (i.e., towards the trailing side 52) of the pressurized pad air bearing surface 56. This mitigates air pressure adjacent the contact surface 60 relative to air pressure adjacent the pressurized pad air bearing surface 56 during operation of the disk drive 10. Such mitigation allows the contact surface 60 to effectively carry a negligible amount of force in comparison the amount of force support by the pressurized pad air bearing surface 56 and other air bearing surfaces of the slider 48. Comparatively, the amount of force exerted by the slider 48 at the contact surface 60 in order to maintain sliding contact with the disk 16 is less than that which would be required to be exerted by the prior art air bearing slider 1 (as discussed above) at center pad 4 adjacent the trailing side 3. As such, excessive wear of the slider 48 and the disk 16 may be relatively reduced.

The contact surface 60 is preferably sized smaller than the pressurized pad air bearing surface 56. The relative sizing and positioning of the pressurized pad air bearing surface 56 is a function of the desired aerodynamic properties associated with the same.

According to the embodiment as shown in FIGS. 4 and 5, the slider 48 includes a main support structure 66. A pressurized pad support base 68 and a contact pad support base 70 extend from the main support structure 66. In this embodiment, the pressurized pad support base 68 and the contact pad support base 70 are integrally formed structures. The depressed region 64 extends from the pressurized pad support base 68 and the contact pad support base 70 to the pressurized pad 54 and the contact pad 58.

The pressurized pad 54 extends from the pressurized pad support base 68. In practice, the pressurized pad 54 may extend from the pressurized pad support base 68 by about 0.1 to 0.3 microns. The contact pad 58 extends from the contact pad support base 70. In practice, the contact pad 58 may extend from the contact pad support base 70 by about 0.1 to 0.3 microns. The pressurized pad support base 68 and the contact pad support base 70 may extend from the main support structure 66 by about 1 to 3 microns. As shown, however, for ease of discussion and depiction, it is understood that the relative height of the pressurized pad 54 and the contact pad 58 is exaggerated in relation to the pressurized pad support base 68, the contact pad support base 70 and the main support structure 66. Further, in practice, the depressed region 64 may extend from about 50 to about 300 microns between the pressurized pad 54 and the contact pad 58.

The contact pad 58 is shown to be at the trailing side 52. However, the contact pad 58 may be offset from the trailing side 52 while still adjacent to the trailing side 52. The slider 48 includes lateral sides 72, 74. The pressurized pad 54, the contact pad 58, the pressurized pad support base 68 and the contact pad support base 70 may be centered with respect to such lateral sides 72, 74. Further, the pressurized pad 54 may be laterally centered with respect to the pressurized pad support base 68. The contact pad 58 may be centered with respect to the contact pad support base 70. In the embodiment shown, the contact pad 58 has a lateral width less than that of the contact pad support base 70.

The air bearing slider 48 may further include first and second main rails 76, 78 disposed between the leading and trailing sides 50, 52. The first main rail 76 has a first main rail air bearing surface 80, and the second main rail 78 has a second main rail air bearing surface 82. The pressurized pad 54 and the contract pad 58 are disposed between the first and second main rails 76, 78 and may be centered. This is with respect to the lateral sides 72, 74. A cross support 84 may extend laterally between the first and second main rails 76, 78. The first and second main rails 76, 78 and the cross support 84 are sized and configured for desired aerodynamic properties of the slider 48.

Figure 6:
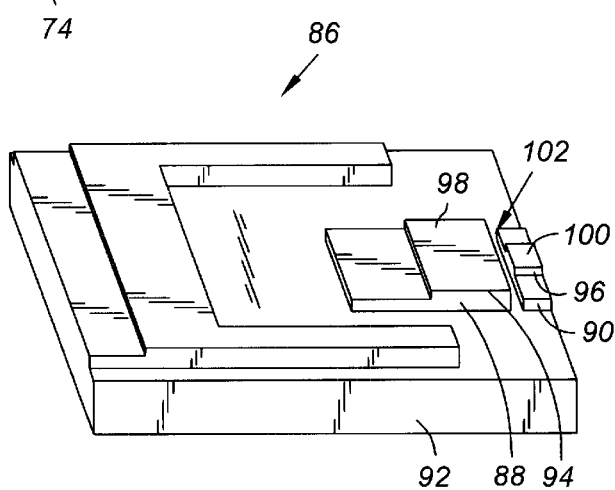
FIG. 6 is a perspective view of another embodiment of an air bearing slider.
Figure 7:
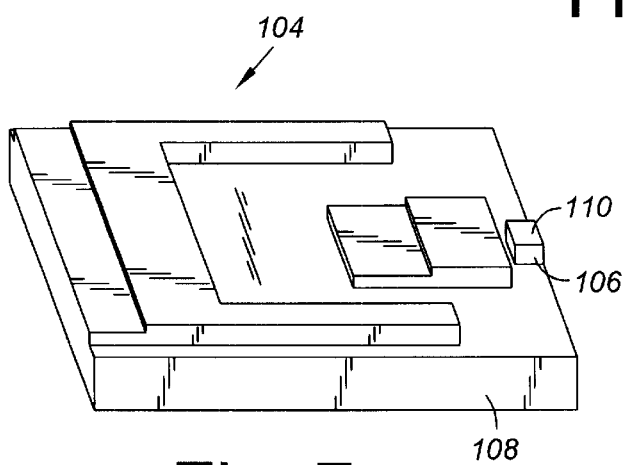
FIG. 7 is a perspective view of another embodiment of an air bearing slider.
Figure 8:
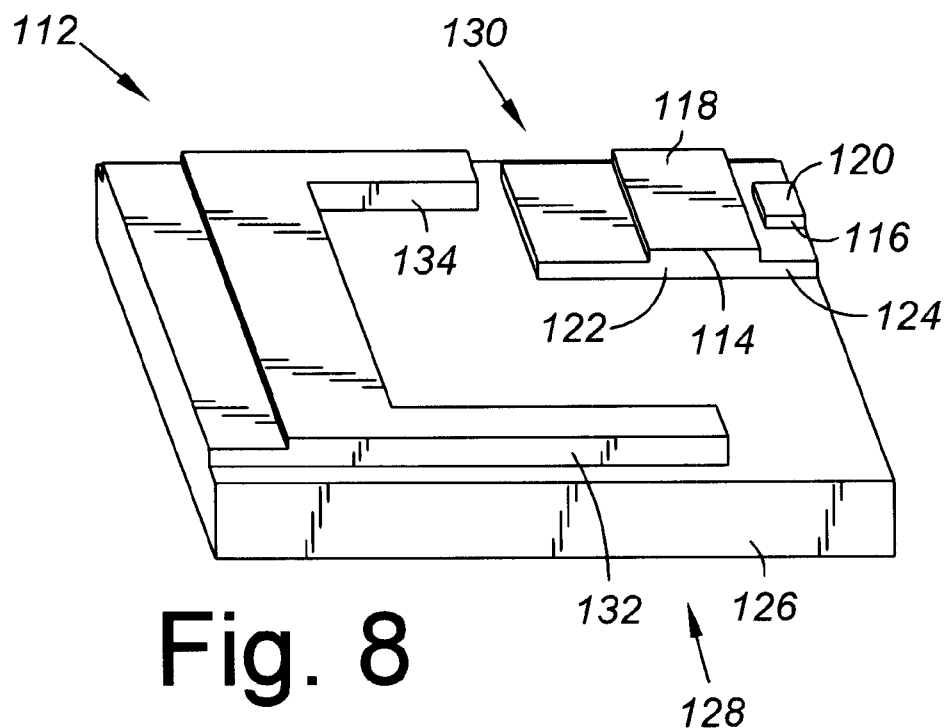
FIG. 8 is a perspective view of another embodiment of an air bearing slider.
Figure 9:
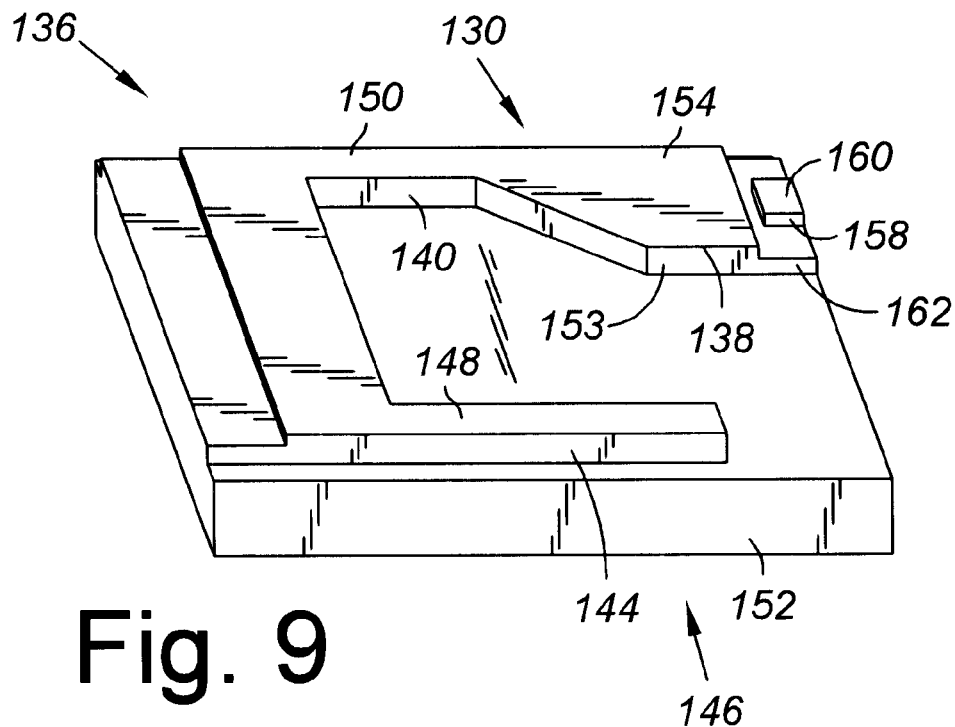
FIG. 9 is a perspective view of another embodiment of an air bearing slider.

Referring now to FIG. 6, there is depicted an air bearing slider 86 according to another embodiment of an aspect of the present invention. The slider 86 is similar in construction to the slider 48, however, with the differences noted herein. Thus, for example, slider 86, as well as the remaining slider embodiments shown in FIGS. 7–9, is understood to include a transducer similar to transducer 62. In this embodiment, the slider 86 includes a pressurized pad support base 88 and a contact pad support base 90 that are separate structures. In this regard, the slider 86 includes a main support structure 92, and the pressurized pad support base 88 and the contact pad support base 90 extend from the main support structure 92. A pressurized pad 94 extends from the pressurized pad support base 88, and a contact pad 96 extends from the contact pad support base 90. The contact pad support base 90 has a lateral width greater than the contact pad 96. The pressurized pad 94 includes a pressurized pad air bearing surface 98, and the contact pad includes a contact surface 100. A depressed region 102 extends from the main support structure 92 to the pressurized pad air bearing surface 98 and the contact surface 100 between the pressurized pad support base 88 and the contact pad support base 90. It is contemplated that the depressed region 102 facilitates a relatively increased volume for air expansion in comparison to the depressed region 64 of slider 48.

Referring now to FIG. 7, there is depicted an air bearing slider 104 according to another embodiment of an aspect of the present invention. The slider 104 is similar in construction to the slider 86, however, the slider 104 includes a contact pad 106 that extends directly from a main support structure 108. The contact pad includes a contact surface 110.

Referring now to FIG. 8, there is depicted an air bearing slider 112 according to another embodiment of an aspect of the present invention. The slider 112 is similar in construction to the slider 48, however, the slider 112 includes a pressurized pad 114 and contact pad 116 that are laterally off-centered. The pressurized pad 114 has a pressurized pad air bearing surface 118, and the contact pad 116 has a contact surface 120. The slider 112 includes a pressurized pad support base 122 and a contact pad support base 124 that extend from a main support structure 126. The slider 112 has opposing lateral sides 128, 130. The pressurized pad support base 122 and the contact pad support base 124 are biased towards the lateral side 130. The slider 112 further includes first and second main rails 132, 134. Although commonly extending from the main support structure 126, the pressurized pad support base 122 and a contact pad support base 124 are separate structures from the first and second main rails 132, 134. The length of the first and second main rails 132, 134 may be of differing size so as to accommodate the separate nature of the pressurized pad support base 122 and a contact pad support base 124.

Referring now to FIG. 9, there is depicted an air bearing slider 136 according to another embodiment of an aspect of the present invention. The slider 136 is similar in construction to the slider 112, however, the slider 136 has a pressurized pad 138 that is integrally formed with a second main rail 140. The second main rail 140 is disposed adjacent a lateral side 142 of the slider 136. An opposing first main rail 144 is disposed adjacent an opposing lateral side 146 of the slider 136. The first main rail 144 has an air bearing surface 148, and the second main rail has an air bearing surface 150. The first and second main rails 144, 140 extend from a main support structure 152 of the slider 136. The pressurized pad 138 includes a pressurized pad air bearing surface 154. The pressurized pad 138 extends from a pressurized pad support base 156 that extends from the main support structure 152. The slider 136 further includes a contact pad 158 that has a contact surface 160. The contact pad 158 extends from a contact pad support structure 162 that extends from the main support structure 152 and may be integrally formed with the pressurized pad support base 156. The pressurized pad 138 is integrally formed with the second main rail 140. Further, the air bearing surface 150 of the second main rail 140 is also integrally formed with the pressurized pad air bearing surface 154.

According to additional aspects of the present invention, the above-described air bearing sliders 48, 86, 104, 112, and 136 may be incorporated into disk drive such as disk drive 10.

We claim:

1. An air bearing slider for use in disk drive including a rotatable magnetic disk, the slider comprising:
   a leading side and a trailing side;
   a pressurized pad including a pressurized pad air bearing surface, the pressurized pad being disposed between the leading and trailing sides; and
   a contact pad disposed adjacent the trailing side and including a contact surface for sliding contact with the magnetic disk during operation of the disk drive, the contact pad including a transducer disposed within the contact pad for reading and writing data from and to the magnetic disk;
   a depressed region disposed between the pressurized pad and the contact pad for mitigating air pressure adjacent the contact surface relative to air pressure adjacent the pressurized pad air bearing surface during operation of the disk drive;
   a pressurized pad support base, the pressurized pad extending from the pressurized pad support base;
   a contact pad support base, the contact pad extending from the contact pad support base; and
   a main support structure, the pressurized pad support base and the contact pad support base extending from the main support structure, the depressed region extending from the main support structure between the pressurized pad support base and the contact pad support base.

2. The air bearing slider of claim 1 wherein the contact surface is sized smaller than the pressurized pad air bearing surface.

3. The air bearing slider of claim 1 further comprises first and second main rails disposed between the leading and trailing sides, the first main rail has a first main rail air bearing surface, the second main rail has a second main rail air bearing surface, the pressurized pad is disposed between the first and second main rails.

4. The air bearing slider of claim 3 wherein the pressurized pad and the contact pad are centered with respect to the first and second main rails.

5. The air bearing slider of claim 1 wherein the contact pad extend from the contact pad support base by about 0.1 to 0.3 microns.

6. The air bearing slider of claim 1 wherein the pressurized pad support base and the contact pad support base extend from the main support structure by about 1 to 3 microns.

7. The air bearing slider of claim 1 wherein the depressed region extends from about 50 to about 300 microns between the pressurized pad and the contact pad in a direction between the leading a trailing sides.

8. A disk drive comprising:
   a rotatable magnetic disk; and
   an air bearing slider including:
      a leading side and a trailing side;
      a pressurized pad including a pressurized pad air bearing surface, the pressurized pad being disposed between the leading and trailing sides; and
      a contact pad disposed adjacent the trailing side and including a contact surface for sliding contact with the magnetic disk during operation of the disk drive, the contact pad including a transducer disposed within the contact pad for reading and writing data from and to the magnetic disk; and
      a depressed region disposed between the pressurized pad and the contact pad for mitigating air pressure adjacent the contact surface relative to air pressure adjacent the pressurized pad air bearing surface during operation of the disk drive;
      a pressurized pad support base, the pressurized pad extending from the pressurized pad support base;
      a contact pad support base, the contact pad extending from the contact pad support base; and
      a main support structure, the pressurized pad support base and the contact pad support base extending from the main support structure, the depressed region extending from the main support structure between the pressurized pad support base and the contact pad support base.

9. The disk drive of claim 8 wherein the contact surface is sized smaller than the pressurized pad air bearing surface.

10. The disk drive of claim 8 further comprises first and second main rails disposed between the leading and trailing sides, the first main rail has a first main rail air bearing surface, the second main rail has a second main rail air bearing surface, the pressurized pad is disposed between the first and second main rails.

11. The disk drive of claim 10 wherein the pressurized pad and the contact pad are centered with respect to the first and second main rails.

12. The disk drive of claim 8 wherein the contact pad extend from the contact pad support base by about 0.1 to 0.3 microns.

13. The disk drive of claim 8 wherein the pressurized pad support base and the contact pad support base extend from the main support structure by about 1 to 3 microns.

14. The disk drive of claim 8 wherein the depressed region extends from about 50 to about 300 microns between the pressurized pad and the contact pad in a direction between the leading a trailing sides.

* * * * *